(12) United States Patent
Nakao et al.

(10) Patent No.: US 12,730,084 B2
(45) Date of Patent: Sep. 8, 2026

(54) SENSITIVE MEMBRANE AND GAS SENSOR

(71) Applicant: PANASONIC HOUSING SOLUTIONS CO., LTD., Osaka (JP)

(72) Inventors: Atsuo Nakao, Nara (JP); Atsushi Shunori, Osaka (JP)

(73) Assignee: PANASONIC HOUSING SOLUTIONS CO., LTD., Osaka (JP)

(*) Notice: Subject to any disclaimer, the term of this patent is extended or adjusted under 35 U.S.C. 154(b) by 108 days.

(21) Appl. No.: 18/282,451

(22) PCT Filed: Mar. 16, 2022

(86) PCT No.: PCT/JP2022/011854
§ 371 (c)(1),
(2) Date: Sep. 15, 2023

(87) PCT Pub. No.: WO2022/196723
PCT Pub. Date: Sep. 22, 2022

(65) Prior Publication Data

US 2024/0151673 A1 May 9, 2024

(30) Foreign Application Priority Data

Mar. 19, 2021 (JP) ................................ 2021-046557

(51) Int. Cl.
*G01N 27/12* (2006.01)

(52) U.S. Cl.
CPC .................................. *G01N 27/12* (2013.01)

(58) Field of Classification Search
CPC .............................. G01N 27/12; G01N 27/04
See application file for complete search history.

(56) References Cited

U.S. PATENT DOCUMENTS 3,983,527 A 9/1976 Ohsato et al.
4,631,952 A * 12/1986 Donaghey .............. G01N 27/12 338/34
4,942,364 A 7/1990 Nishijima et al.
5,256,574 A 10/1993 Neuburger et al.
5,456,750 A 10/1995 Mackay et al.
5,474,743 A 12/1995 Trend et al.
6,471,763 B1 10/2002 Karl
(Continued)

FOREIGN PATENT DOCUMENTS

CN 112300578 A 2/2021
JP S50-038236 A 4/1975
(Continued)

OTHER PUBLICATIONS

Lonergan et al., Array-based vapor sensing using chemically sensitive, carbon black-polymer resistors, Chem. Mater., 1996, 8, 2298-2312 (Year: 1996).*
(Continued)

*Primary Examiner* — Shizhi Qian
(74) *Attorney, Agent, or Firm* — Rimon P.C.

(57) ABSTRACT

A sensitive membrane includes: a membrane body containing a sensitive material; and a plurality of conductive particles included in the membrane body. The membrane body is expandable when adsorbing an analyte. An M1/M2 ratio of a mass M1 of the sensitive material to a mass M2 of the plurality of conductive particles is equal to or less than 0.4.

20 Claims, 9 Drawing Sheets

(56) References Cited

U.S. PATENT DOCUMENTS

| | | | | |
|---|---|---|---|---|
| 2003/0219373 | A1 | 11/2003 | Foster | |
| 2004/0202856 | A1* | 10/2004 | Blok | G01N 27/126 428/323 |
| 2008/0125335 | A1* | 5/2008 | Bhavsar | B82Y 15/00 166/243 |
| 2009/0155157 | A1 | 6/2009 | Stenger et al. | |
| 2009/0236566 | A1 | 9/2009 | Nishiura et al. | |
| 2010/0219849 | A1* | 9/2010 | McCoy | G01N 27/122 324/693 |
| 2021/0063337 | A1* | 3/2021 | Dong | G01N 27/122 |

FOREIGN PATENT DOCUMENTS

| | | | | | |
|---|---|---|---|---|---|
| JP | H02-049149 | A | | 2/1990 | |
| JP | H05-036357 | U | | 5/1993 | |
| JP | H11-094784 | A | | 4/1999 | |
| JP | H11-349849 | A | | 12/1999 | |
| JP | 2002-509609 | A | | 3/2002 | |
| JP | 2004-510953 | A | | 4/2004 | |
| JP | 2004-193256 | A | | 7/2004 | |
| JP | 2004211012 | A | * | 7/2004 | |
| JP | 2004-340945 | A | | 12/2004 | |
| JP | 2006-058766 | A | | 3/2006 | |
| JP | 2006-182818 | A | | 7/2006 | |
| JP | 2009-138103 | A | | 6/2009 | |
| JP | 2010-038692 | A | | 2/2010 | |
| JP | 2011-506656 | A | | 3/2011 | |
| JP | 2014-241279 | A | | 12/2014 | |
| JP | 2016-167442 | A | | 9/2016 | |
| JP | 2019-036378 | A | | 3/2019 | |
| WO | 99/01733 | A1 | | 1/1999 | |
| WO | 01/050117 | A1 | | 7/2001 | |
| WO | 2014/185452 | A1 | | 11/2014 | |
| WO | 2017/119428 | A1 | | 7/2017 | |
| WO | 2018/221632 | A1 | | 12/2018 | |
| WO | WO-2019189245 | A1 | * | 10/2019 | G01N 27/12 |

OTHER PUBLICATIONS

Harada et al., JP2004211012A, English translation, 2004 (Year: 2004).*

Wyszynski et al., Array of chemosensitive resistors with composites of gas chromatography (GC) materials and carbon black for detection and recognition of VOCs: an optimization study, All Sensors 2018, the 3rd Int. Conf. on Advances in Sensors, Actuators, Metering and Sensing, 28-32 (Year: 2018).*

Huang, Carbon black filled conducting polymers and polymer blends, Advances in polymer technology, 2002, 21, 299-313 (Year: 2002).*

Shunori et al., WO2019189245A1, English translation, 2019 (Year: 2019).*

International Search Report dated Jun. 7, 2022 issued in International Patent Application No. PCT/JP2022/011854, with English translation.

Nagashima, Kazuki et al. Innovative Molecular Recognition Sensing by Nanowires with Robust Molecular Fingerprint. Proceedings of the 100th CSJ Annual Spring Meeting, Mar. 5, 2020, vol. 100, 1PC-085.

International Search Report dated Jun. 7, 2022 issued in International Patent Application No. PCT/JP2022/012098, with English translation.

International Search Report dated Jun. 7, 2022 issued in International Patent Application No. PCT/JP2022/012099, with English translation.

Non-Final Office Action dated Jun. 4, 2025 issued in related U.S. Appl. No. 18/550,085.

Non-Final Office Action dated Oct. 2, 2025 issued in related U.S. Appl. No. 18/550,078.

Office Action received in the related Japanese Patent Application No. 2023-507168, dated Apr. 21, 2026.

Office Action received in the related Chinese Patent Application No. 202280020888.8, dated May 23, 2026, and it's English Translation of Search Report.

Office Action received in the related U.S. Appl. No. 18/550,078, dated Apr. 2, 2026.

Office Action received in the related U.S. Appl. No. 18/550,085, dated Apr. 8, 2026.

* cited by examiner

SENSITIVE MEMBRANE AND GAS SENSOR

CROSS-REFERENCE OF RELATED APPLICATIONS

This application is the U.S. National Phase under 35 U.S.C. § 371 of International Patent Application No. PCT/JP2022/011854, filed on Mar. 16, 2022, which in turn claims the benefit of Japanese Patent Application No. 2021-046557, filed on Mar. 19, 2021, the entire disclosures of which Applications are incorporated by reference herein.

TECHNICAL FIELD

The present disclosure generally relates to a sensitive membrane and a gas sensor. More particularly, the present disclosure relates to a sensitive membrane including a membrane body containing a sensitive material and a carbon black contained in the membrane body and a gas sensor.

BACKGROUND ART

Patent Literature 1 discloses a sensor for use in an artificial olfactory system. This sensor detects an analyte in a fluid, includes a layer containing conductive modification particles, and is electrically connected to an electrical measuring device. The conductive modification particles include a carbon black having at least one organic group.

This type of sensor tends to respond to water other than the analyte, which is a problem with this type of sensor.

CITATION LIST

Patent Literature

Patent Literature 1: JP 2004-510953 A

SUMMARY OF INVENTION

An object of the present disclosure is to provide a sensitive membrane, which may reduce the response to water, and a gas sensor including such a sensitive membrane.

A sensitive membrane according to an aspect of the present disclosure includes: a membrane body containing a sensitive material; and a plurality of conductive particles included in the membrane body. The membrane body is expandable when adsorbing an analyte. An M1/M2 ratio of a mass M1 of the sensitive material to a mass M2 of the plurality of conductive particles is equal to or less than 0.4.

A sensitive membrane according to another aspect of the present disclosure includes: a membrane body containing a sensitive material; and a plurality of conductive particles included in the membrane body. The membrane body is expandable when adsorbing an analyte. A V1/V2 ratio of a volume V1 of the sensitive material to a volume V2 of the plurality of conductive particles is equal to or less than 0.72.

A gas sensor according to still another aspect of the present disclosure includes: the sensitive membrane described above; and an electrode electrically connected to the sensitive membrane.

BRIEF DESCRIPTION OF DRAWINGS

FIGS. 2A and 2B illustrate how the sensitive membrane of the gas sensor operates;

FIG. 2C is a graph showing how the resistance value may change with time through the operation of the sensitive membrane of the gas sensor;

DESCRIPTION OF EMBODIMENTS

Embodiment (1) Overview

Figure 1A:
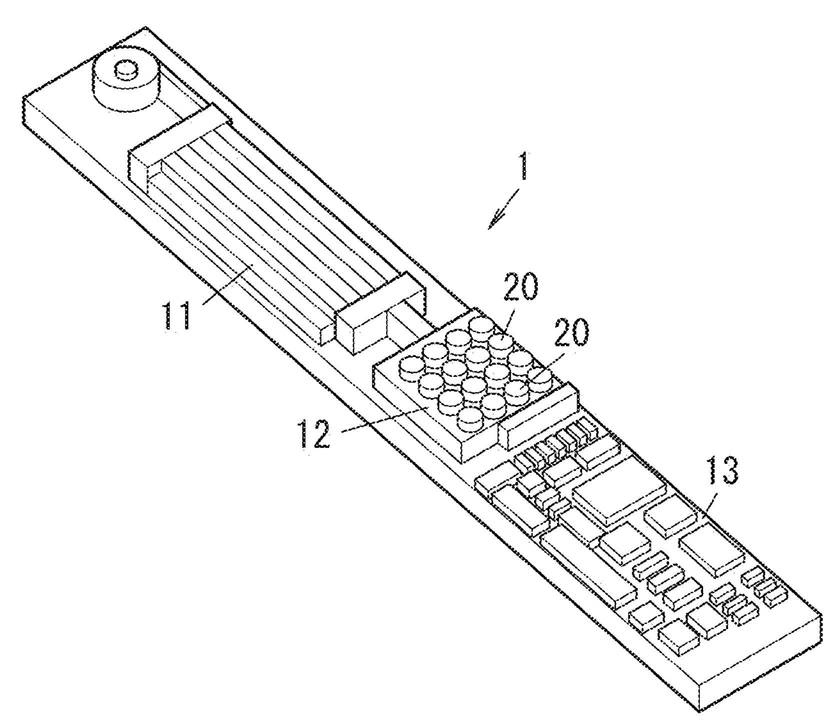
FIG. 1A is a perspective view illustrating a gas sensor according to an exemplary embodiment of the present disclosure.

FIG. 1A illustrates a schematic configuration for a gas sensor 1 according to an exemplary embodiment of the present disclosure. The gas sensor 1 may be used to, for example, detect odor molecules as detection target molecules. Examples of the odor molecules include volatile organic compounds (VOCs) and ammonia. The gas sensor 1 is used to detect VOCs as detection target molecules. The gas sensor 1 detects VOCs as odor molecules included in a sample gas such as a gas taken from a food, a breath taken from a human body, or the air taken from a building room. Note that the detection target molecules to be detected by the gas sensor 1 do not have to be VOCs but may also be multiple types of odor molecules including VOCs or non-odor molecules such as molecules of a flammable gas or a poisonous gas like carbon monoxide.

As shown in FIG. 1A, the gas sensor 1 includes a supply unit 11, a sensor unit 12, and a processing unit 13. The supply unit 11 supplies a sample gas including odor molecules and a reference gas to the sensor unit 12. The sensor unit 12 includes a plurality of sensitive membranes 20 and a plurality of electrodes 21. The processing unit 13 includes a detection unit for detecting a variation in the resistance value measured by the sensor unit 12 and a control unit for controlling the operation of the gas sensor 1. The supply unit 11 includes piping through which the sample gas and the reference gas circulate. The processing unit 13 includes electric circuits serving as the detection unit and the control unit.

Figure 1B:
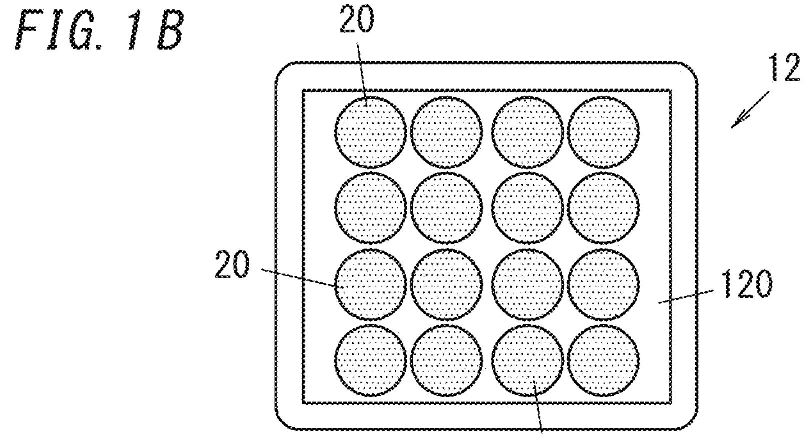
FIG. 1B is a plan view illustrating a sensor unit of the gas sensor.

As shown in FIG. 1B, the sensor unit 12 is formed by providing a plurality of sensitive membranes 20 on a substrate 120. A number of sensitive membranes 20 are arranged vertically and horizontally to form an array (e.g., a 4×4 array in this embodiment) of sensitive membranes 20. Each of these sensitive membranes 20 is formed in a circular pattern in plan view. Note that the number, arrangement, and shape of the sensitive membranes 20 in the sensor unit 12 do not have to be the ones shown in FIG. 1B but may also be changed as appropriate according to the type of the gas sensor 1, for example.

Figure 1C:
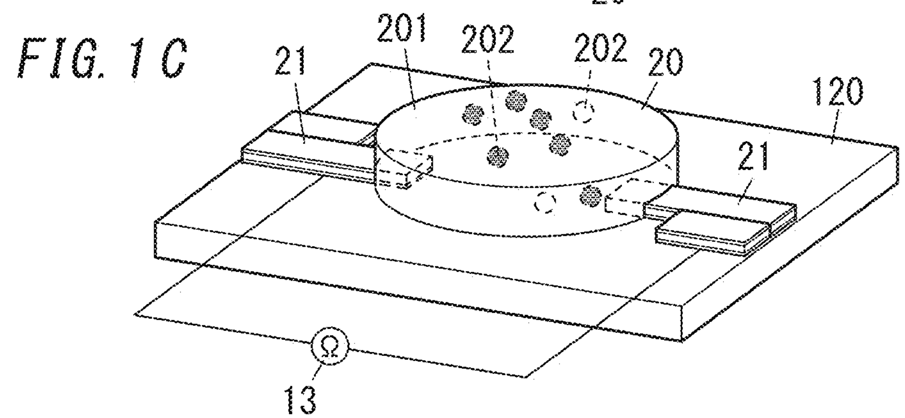
FIG. 1C is a perspective view illustrating a sensitive membrane of the gas sensor.

As shown in FIG. 1C, each sensitive membrane 20 includes a membrane body 201 and conductive particles 202. The conductive particles 202 are dispersed in the matrix of the membrane body 201.

The membrane body 201 contains a sensitive material. An appropriate sensitive material is selected according to, for example, the type of the chemical substance to be adsorbed by the membrane body 201 and/or the type of the conductive particles 202. The sensitive material may be an organic material having electrical insulation properties and includes, for example, at least one material selected from the group consisting of high molecular (macromolecular) materials and low molecular materials. The sensitive material preferably includes a high molecular material, in particular. Note that if the sensitive material includes a high molecular material, the membrane body 201 may have heat resistance.

Examples of preferred sensitive materials include materials commercially available as stationary phases for columns in gas chromatographs. More specifically, the sensitive material may include, for example, at least one material selected from the group consisting of polyalkylene glycols, polyesters, silicones, glycerols, nitriles, dicarboxylic acid monoesters, and aliphatic amines. This allows the membrane body 201 to easily adsorb chemical substances (volatile organic compounds, in particular) in the gas.

The polyalkylene glycols include, for example, polyethylene glycol (with a heat resistant temperature of 170° C.). The polyesters include, for example, at least one material selected from the group consisting of poly(diethylene glycol adipate) and poly(ethylene succinate). The silicones include, for example, at least one material selected from the group consisting of dimethyl silicone, phenylmethyl silicone, trifluoropropyl methyl silicone, and cyanosilicone (with a heat resistant temperature of 275° C.). The glycerols include, for example, diglycerol (with a heat resistant temperature of 150° C.). The nitriles include at least one material selected from the group consisting of, for example, N,N-bis (2-cyanoethyl) formamide (with a heat resistant temperature of 125° C.) and 1,2,3-tris (2-cyanoethoxy) propane (with a heat resistant temperature of 150° C.). The dicarboxylic acid monoesters include at least one material selected from the group consisting of, for example, nitro terephthalic acid-modified polyethylene glycol (with a heat resistant temperature of 275° C.) and diethylene glycol succinate (with a heat resistant temperature of 225° C.). The aliphatic amines include, for example, tetra hydroxyethyl ethylenediamine (with a heat resistant temperature of 125° C.).

The conductive particles 202 are particles that form a carbon black. The carbon black is an aggregate of ultrafine spherical particles formed through incomplete combustion of a compound including either hydrocarbon or carbon. Optionally, the membrane body 201 may include, as particles with electrical conductivity, not only the carbon black but also at least one material selected from the group consisting of conductive polymers, metals, metal oxides, semiconductors, superconductors, and complex compounds.

A pair of electrodes 21 are connected to the sensitive membrane 20. Each of these electrodes 21 is electrically connected to the conductive particles 202 in the sensitive membrane 20. The pair of electrodes 21 are also electrically connected to the detection unit of the processing unit 13.

Figures 2A, 2B, 2C:
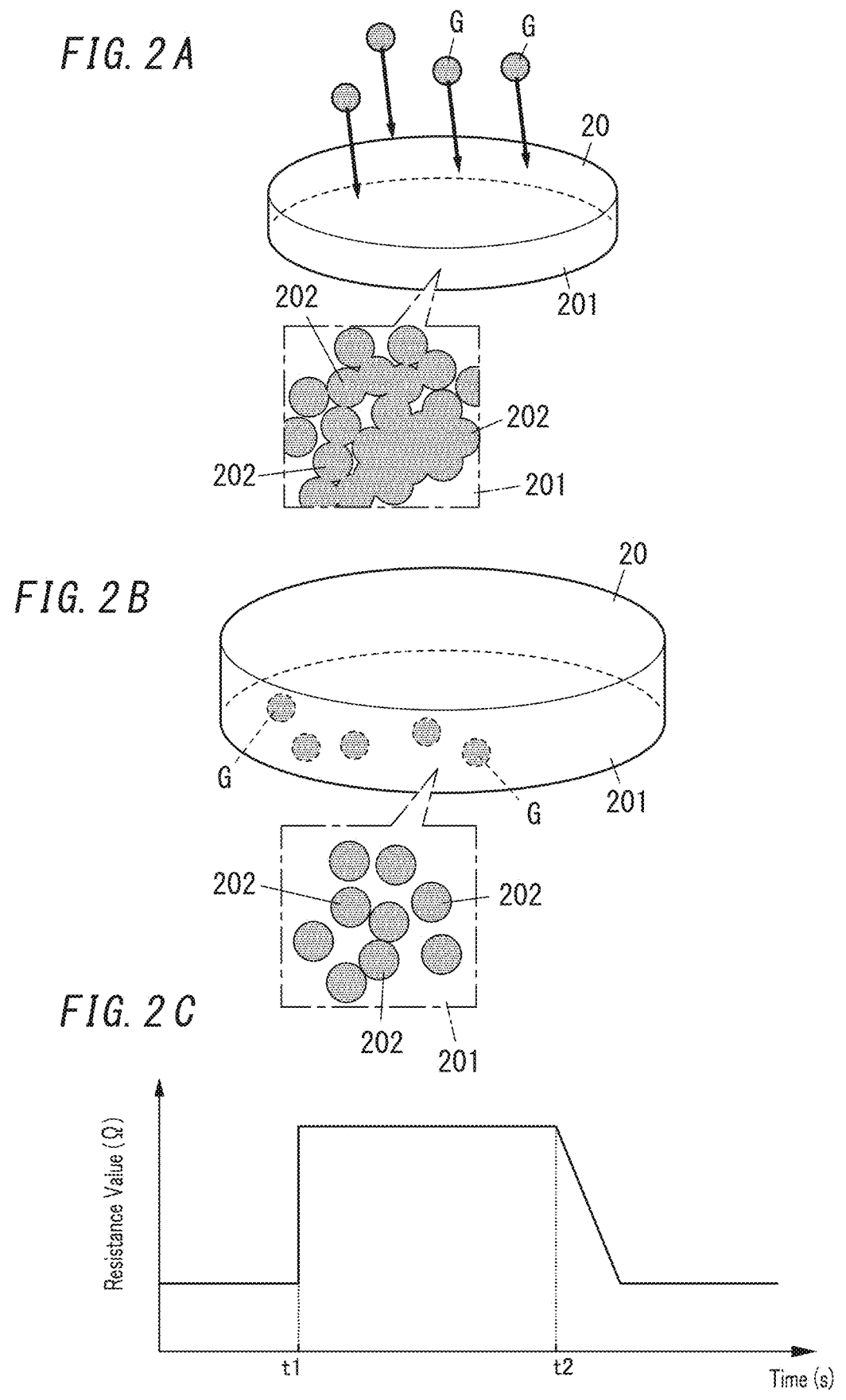

In such a sensitive membrane 20, the membrane body 201 is less thick before adsorbing the odor molecules G as shown in FIG. 2A. That is to say, the plurality of conductive particles 202 are dispersed more densely in the membrane body 201. Once the sensitive membrane 20 has adsorbed the odor molecules G, the membrane body 201 expands to have an increased thickness. That is to say, the plurality of conductive particles 202 are dispersed more sparsely in the membrane body 201 (refer to FIG. 2B). As a result, the sensitive membrane 20 comes to have an increased resistance value when adsorbing the odor molecules G at a time t1 as shown in FIG. 2C. Meanwhile, as the odor molecules G desorb from the sensitive membrane 20, the membrane body 201 of the sensitive membrane 20 shrinks to have a decreased thickness. As a result, the resistance value of the sensitive membrane 20 gradually decreases since a time t2 when the odor molecules G start to desorb. The gas sensor 1 may determine, by making the detection unit of the processing unit 13, which is electrically connected to the electrodes 21, detect this change in the resistance value, whether there are any odor molecules G in the sample gas supplied from the supply unit 11 to the sensor unit 12.

(2) Details

In general, there are two types of carbon blacks, namely, a "conductive carbon black" and a "coloring carbon black." The conductive carbon black is mainly used as a conductive material in various fields for films, IC trays, sheet heating elements, magnetic tapes, and conductive rubber. The coloring carbon black is mainly used as a black pigment in various fields for newspaper inks, printing inks, resin coloring, paints, and toners. The conductive carbon black and the coloring carbon black may be distinguished by the degree of development of a network structure (i.e., so-called "structure") formed by carbon black particles (conductive particles 202). The conductive carbon black has a well-developed structure, while the coloring carbon black has a structure which is developed less fully than the conductive carbon black. That is to say, the structure is formed by bonding carbon black particles together both chemically and physically. The carbon black with the well-developed structure has a lot of carbon black particles that are chemically and physically bonded together. On the other hand, the carbon black with an undeveloped structure has a smaller number of carbon black particles that are bonded together chemically and physically.

In this embodiment, a carbon black with an undeveloped structure is preferably used as the carbon black. Specifically, in this embodiment, a carbon black having a dibutyl phthalate absorption number (hereinafter referred to as a "DBP absorption number") less than 100 $cm^3$/100 g is preferably used. Meanwhile, a carbon black having a DBP absorption number equal to or greater than 100 $cm^3$/100 g has a well-developed structure, and therefore, is preferably not used in this embodiment. Note that the DBP absorption number herein refers to the number of DBP (dibutyl phthalate) particles absorbed into 100 g of carbon black and is measured in accordance with the JIS K 6221 standard.

According to another method for evaluating the degree of development of the structure, a Stokes mode diameter (Dst) of an aggregate as measured by centrifugal sedimentation analysis may also be used. Specifically, a value calculated by the following method may be used as Dst.

First, a sample solution with a carbon black concentration of 0.01 wt % is prepared by adding a precisely weighed carbon black to a 20% ethanol aqueous solution containing a surfactant. The carbon black is sufficiently dispersed in the sample solution with ultrasonic waves and a solution thus prepared is used as a measurement sample. On the other hand, 10 ml of spin liquid (pure water) is injected into a particle size distribution analyzer that uses centrifugal sedimentation, 1 ml of buffer solution (20 vol % ethanol aqueous solution) is further injected thereto, and then 1 ml of the measurement sample prepared as described above is injected thereto. The Stokes equivalent diameter is measured by centrifugal sedimentation at a number of revolutions of 6000 rpm. Thereafter, a histogram representing a relative frequency of occurrence is plotted with respect to the Stokes equivalent diameters thus measured. In the histogram thus plotted, a Stokes equivalent diameter at the maximum frequency is regarded as Dst.

Meanwhile, the mean primary particle size (D0) of the carbon black may be calculated by observing the carbon black particles (conductive particles 202) in the sensitive membrane 20 through an electron microscope.

There is correlation between the DBP absorption number and the Dst/D0 ratio. A Dst/D0 ratio less than 4 corresponds to a DBP absorption number less than 100 $cm^3$/100 g.

As for the mechanism that causes a carbon black to have electrical conduction in a polymer matrix (such as the membrane body 201), there are two competitive theories, namely, a so-called "conductive passage theory," according to which π electrons move through the structure, and a so-called "tunneling effect theory," according to which electrical conduction is produced by causing π electrons to jump through the gap between the particles. The carbon black having a DBP absorption number equal to or greater than 100 $cm^3$/100 g has such a developed structure that the electrical conduction through the conductive passage would be prevailing. On the other hand, the carbon black having a DBP absorption number less than 100 $cm^3$/100 g has such an undeveloped structure that the electrical conduction due to the tunneling effect would be prevailing. In the sensitive membrane 20 according to this embodiment, electrical conduction would be produced by the tunneling effect of the carbon black, thus causing the resistance value to change more significantly due to adsorption of the odor molecules G and thereby allowing the gas sensor 1 to have higher sensitivity.

A lower limit of the DBP absorption number of the carbon black is not set at any particular value but is preferably equal to or greater than 50 $cm^3$/100 g. In that case, Dst/D0 will be equal to or greater than 2.

In the sensitive membrane 20 according to this embodiment, an M1/M2 ratio of the mass M1 of the sensitive material to the mass M2 of the plurality of conductive particles is preferably equal to or less than 0.4. In particular, the M1/M2 ratio of the mass M1 of the sensitive material to the mass M2 of the plurality of conductive particles is more preferably equal to or greater than 0.025 and equal to or less than 0.25. This reduces the response of the sensitive membrane 20 to water, thus relatively increasing the responsivity of the sensitive membrane 20 to the analyte.

Figure 3A:
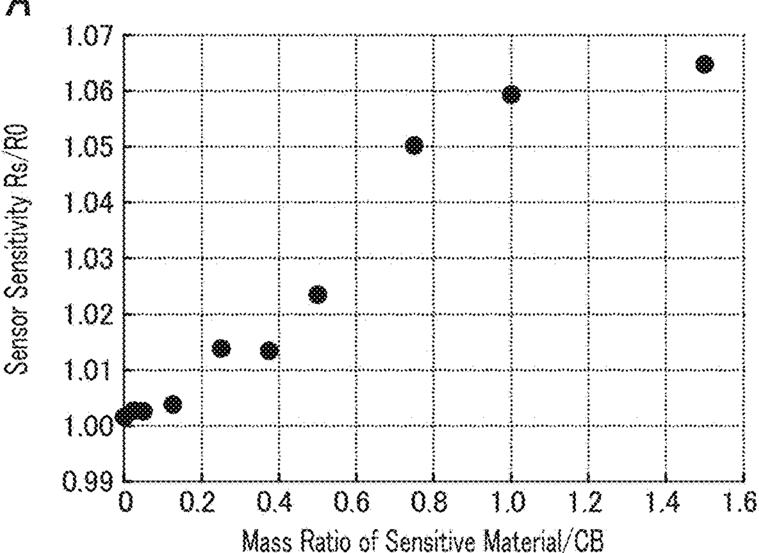
FIG. 3A is a graph showing the sensor sensitivity of the gas sensor to an analyte (VOCs) by plotting how the sensor sensitivity changes with a ratio by mass of a sensitive material to a carbon black.

FIG. 3A shows the sensor sensitivity to an analyte. This sensor sensitivity is plotted with respect to the ratio by mass (M1/M2 ratio) of the sensitive material to the plurality of conductive particles. The evaluation gas is dry air containing 10 ppm of benzaldehyde as an analyte. As the plurality of conductive particles, a carbon black was used. As the sensitive material, bis cyanopropyl-cyanopropylphenyl polysiloxane (product name SP-2330 manufactured by Sigma-Aldrich) was used. The sensor sensitivity is given by Rs/R0, where Rs is the resistance value measured on the sensitive membrane 20 when an evaluation gas is introduced into the gas sensor 1 and R0 is the resistance value measured on the sensitive membrane 20 when an odorless gas is introduced into the gas sensor 1.

As is clear from FIG. 3A, as the ratio by mass of the sensitive material to the plurality of conductive particles increases, the sensor sensitivity rises as well.

Figure 3B:
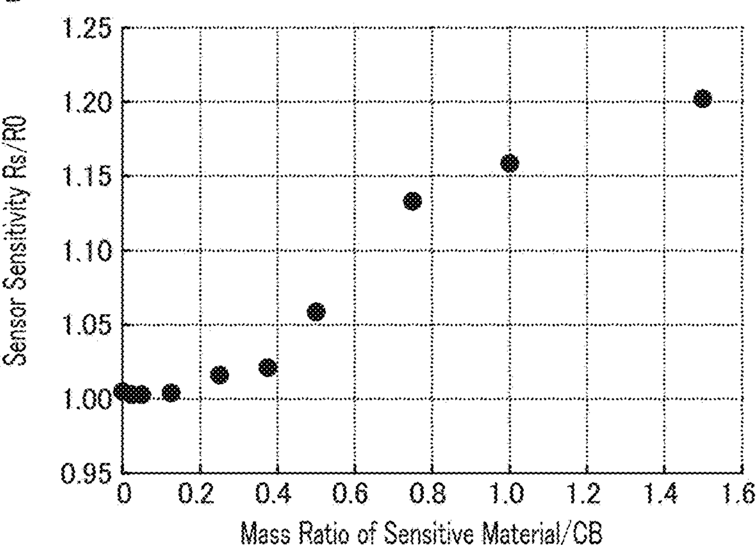
FIG. 3B is a graph showing the sensor sensitivity of the gas sensor to water by plotting how the sensor sensitivity changes with the ratio by mass of the sensitive material to the carbon black.

On the other hand, FIG. 3B shows the sensor sensitivity that was measured with the same sensitive membrane 20 used and with the evaluation gas changed. The evaluation gas is moist air containing 10000 ppm of water. In this case, it can also be seen that as the ratio by mass of the sensitive material to the plurality of conductive particles increases, the sensor sensitivity rises as well.

Figure 3C:
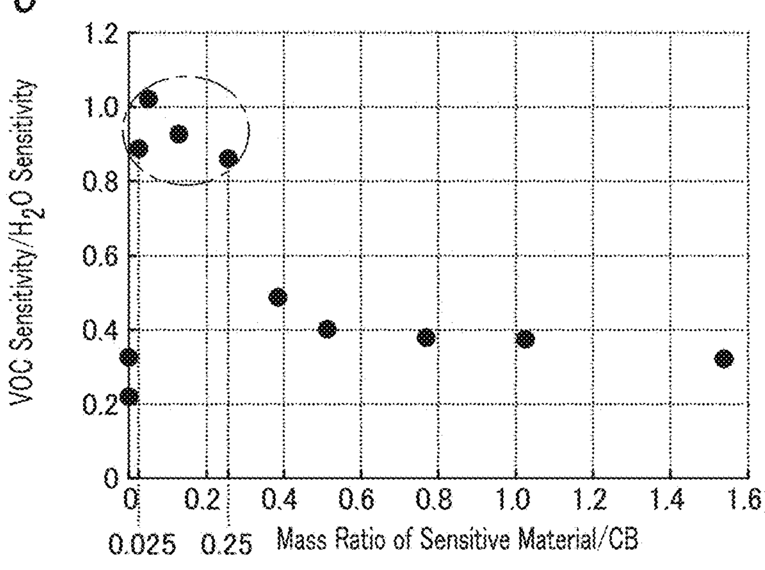
FIG. 3C is a graph showing a relationship between the ratio by mass of the sensitive material to the carbon black and a ratio of the sensor sensitivity to the analyte (VOCs) to the sensor sensitivity to water.

Then, a ratio of VOC sensitivity to $H_2O$ sensitivity, where the VOC sensitivity is the sensor sensitivity shown in FIG. 3A and the $H_2O$ sensitivity is the sensor sensitivity shown in FIG. 3B, was calculated. That is to say, VOC sensitivity/$H_2O$ sensitivity=(resistance variation rate to 10 ppm of benzaldehyde)/(resistance variation rate to 10000 ppm of $H_2O$). The results are shown in FIG. 3C. As can be seen easily from FIG. 3C, if the ratio by mass (M1/M2 ratio) of the sensitive material to the plurality of conductive particles is equal to or less than 0.4, then the VOC sensitivity/$H_2O$ sensitivity increases. In particular, the VOC sensitivity/$H_2O$ sensitivity has a peak in a range where the ratio by mass (M1/M2 ratio) of the sensitive material to the plurality of conductive particles is equal to or greater than 0.025 and equal to or less than 0.25. The VOC sensitivity/$H_2O$ sensitivity values are higher in this range than in any other range. Thus, in the range where the ratio by mass (M1/M2 ratio) of the sensitive material to the plurality of conductive particles is equal to or greater than 0.025 and equal to or less than 0.25, the VOC sensitivity/$H_2O$ sensitivity would reach the maximum value, thus allowing the analyte to be detected with the effect of water reduced.

In the sensitive membrane 20 according to this embodiment, a V1/V2 ratio of the volume V1 of the sensitive material to the volume V2 of the plurality of conductive particles is preferably equal to or less than 0.72. In particular, the V1/V2 ratio of the volume V1 of the sensitive material to the volume V2 of the plurality of conductive particles is more preferably equal to or greater than 0.045 and equal to or less than 0.45. This reduces the response of the sensitive membrane 20 to water, thus relatively increasing the responsivity of the sensitive membrane 20 to the analyte.

Figure 4A:
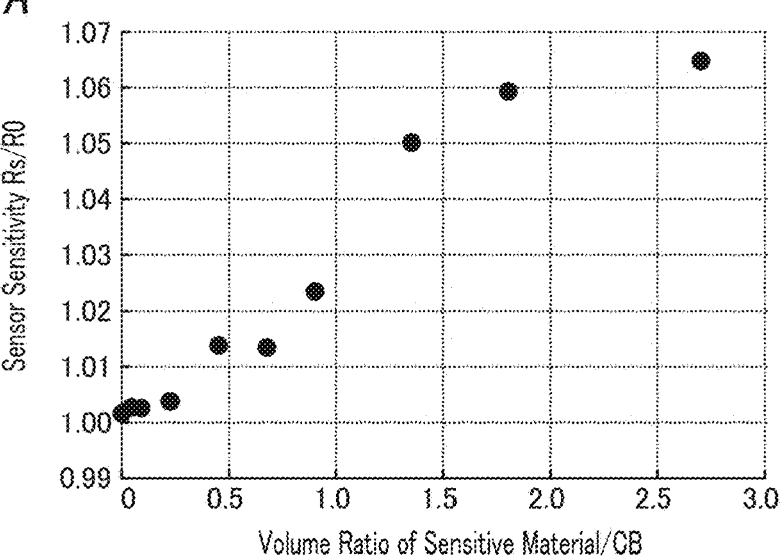
FIG. 4A is a graph showing the sensor sensitivity of the gas sensor to the analyte (VOCs) by plotting how the sensor sensitivity changes with a ratio by volume of a sensitive material to a carbon black.

FIG. 4A shows the sensor sensitivity to an analyte. This sensor sensitivity is plotted with respect to the ratio by volume (V1/V2 ratio) of the sensitive material to the plurality of conductive particles. The evaluation gas and the sensitive membrane 20 are the same as the ones described above. As is clear from FIG. 4A, as the ratio by volume of the sensitive material to the plurality of conductive particles increases, the sensor sensitivity rises as well.

Figure 4B:
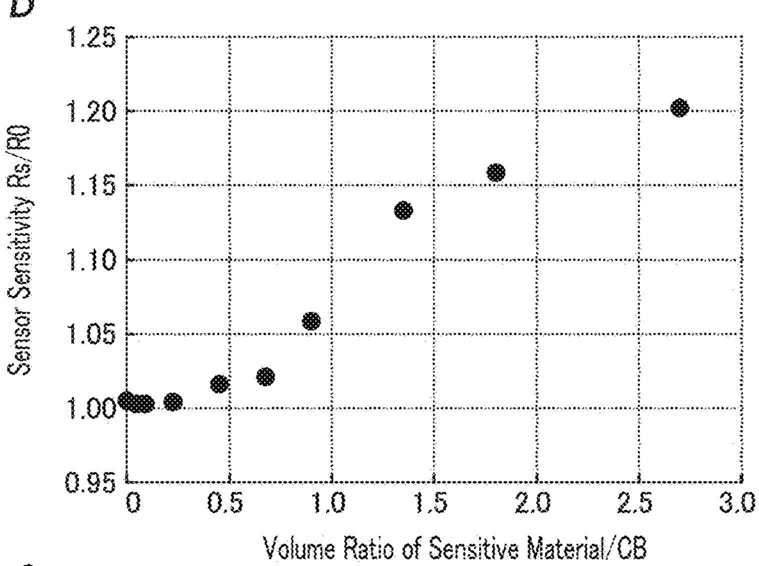
FIG. 4B is a graph showing the sensor sensitivity of the gas sensor to water by plotting how the sensor sensitivity changes with the ratio by volume of the sensitive material to the carbon black.

FIG. 4B shows the sensor sensitivity that was measured with the same sensitive membrane 20 used and with the evaluation gas changed. The evaluation gas is air containing 10000 ppm of water. In this case, it can also be seen that as the ratio by volume of the sensitive material to the plurality of conductive particles increases, the sensor sensitivity rises as well.

Figure 4C:
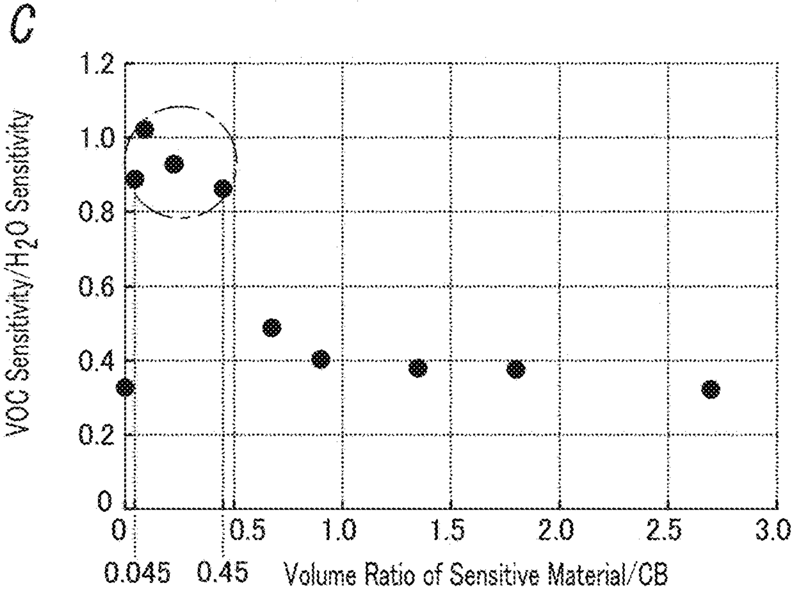
FIG. 4C is a graph showing a relationship between the ratio by volume of the sensitive material to the carbon black and a ratio of the sensor sensitivity to the analyte (VOCs) to the sensor sensitivity to water.

Then, a ratio of VOC sensitivity to $H_2O$ sensitivity, where the VOC sensitivity is the sensor sensitivity shown in FIG. 4A and the $H_2O$ sensitivity is the sensor sensitivity shown in FIG. 4B, was calculated. The results are shown in FIG. 4C. As can be seen easily from FIG. 4C, if the ratio by volume (V1/V2 ratio) of the sensitive material to the plurality of conductive particles is equal to or less than 0.72, then the VOC sensitivity/$H_2O$ sensitivity increases. In particular, the VOC sensitivity/$H_2O$ sensitivity has a peak in a range where the ratio by volume (V1/V2 ratio) of the sensitive material to the plurality of conductive particles is equal to or greater than 0.045 and equal to or less than 0.45. The VOC sensitivity/$H_2O$ sensitivity values are higher in this range than in any other range. Thus, in the range where the ratio by volume (V1/V2 ratio) of the sensitive material to the plurality of conductive particles is equal to or greater than 0.045 and equal to or less than 0.45, the VOC sensitivity/$H_2O$ sensitivity would reach the maximum value, thus allowing the analyte to be detected with the effect of water reduced. These results reveal that from a point of view of volume, if the sensitive membrane 20 contains a sensitive material, of which the volume is greater than 50% of the volume of the plurality of conductive particles (carbon black), then the response of the sensitive membrane 20 to water would increase. In that case, chances are that a free sensitive material, other than the sensitive material coating the surroundings of the plurality of conductive particles, would respond to water.

Figure 5A:
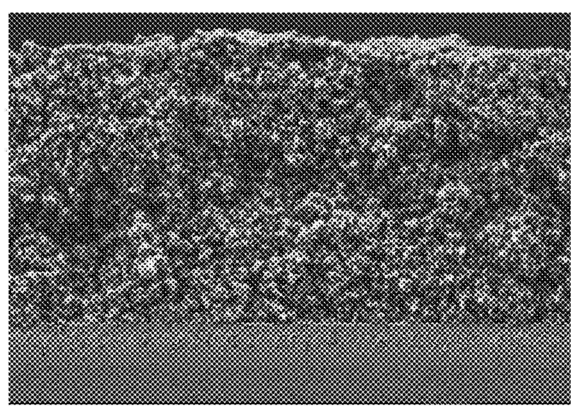
FIG. 5A is a scanning electron micrograph showing a cross section of the sensitive membrane of the gas sensor.
Figure 5B:
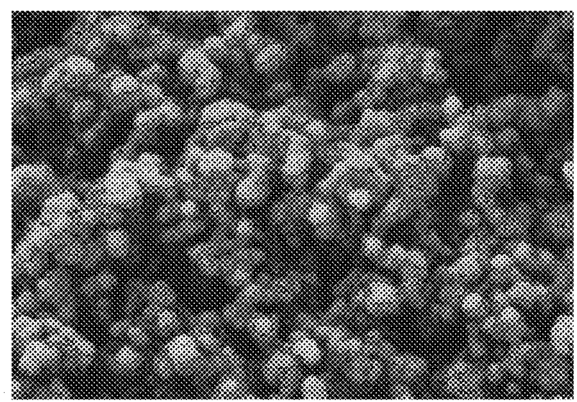
FIG. 5B is a zoomed version of the scanning electron micrograph shown in FIG. 5A.
Figure 5C:
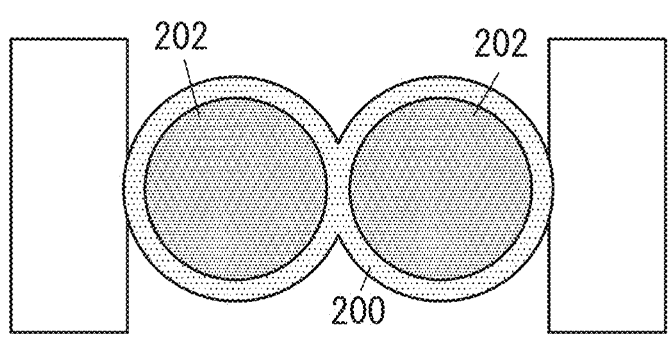
FIGS. 5C and 5D are schematic representations of a cross section of the sensitive membrane of the gas sensor.
Figure 5D:
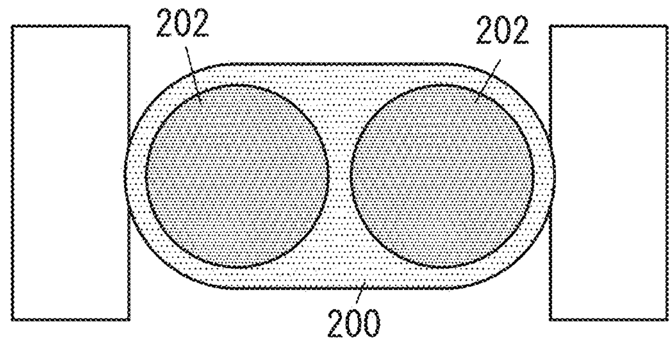

FIG. 5A is a scanning electron micrograph of a cross section of the sensitive membrane 20. FIG. 5B is a zoomed version of the scanning electron micrograph shown in FIG. 5A. The plurality of conductive particles may be supposed to have a structure that coats the sensitive material forming the membrane body 201 of the sensitive membrane 20. FIG. 5C schematically illustrates a state of the conductive particles 202 in the sensitive membrane 20 in a situation where the content of the sensitive material in the sensitive membrane 20 is relatively small. In that case, the sensitive material 200 coats the entire outer surface of the plurality of conductive particles 202. On the other hand, in a situation where the content of the sensitive material in the sensitive membrane 20 is relatively large, the sensitive material 200 is also present in the gap between adjacent ones of the plurality of conductive particles 202 as shown in FIG. 5D. If the conductive particles 202 have a mean particle size of 15 nm, then a thickness of the coating layer (sensitive material), at which the ratio by volume of the sensitive material to the plurality of conductive particles is 50:100, is about 2.2 nm. If the sensitive material is too much, then a free part of the sensitive material would affect the responsivity, which would lead to an increase in the responsivity of the sensitive membrane 20 to water.

In the sensitive membrane 20 according to this embodiment, if a carbon black (CB) is used as the plurality of conductive particles 202, then the carbon black particles preferably have as small a number of surface functional group as possible. This enables reducing the response of the sensitive membrane 20 to water.

There are surface functional groups on the surface of the carbon black particles (conductive particles 202). Examples of the surface functional groups include a carboxyl group, a hydroxyl group, and a quinone group. In general, the larger the number of the surface functional groups of the carbon black is, the higher its volatile content is. That is to say, as the volatile content of the carbon black increases, the number of the surface functional groups increases as well.

Figure 6A:
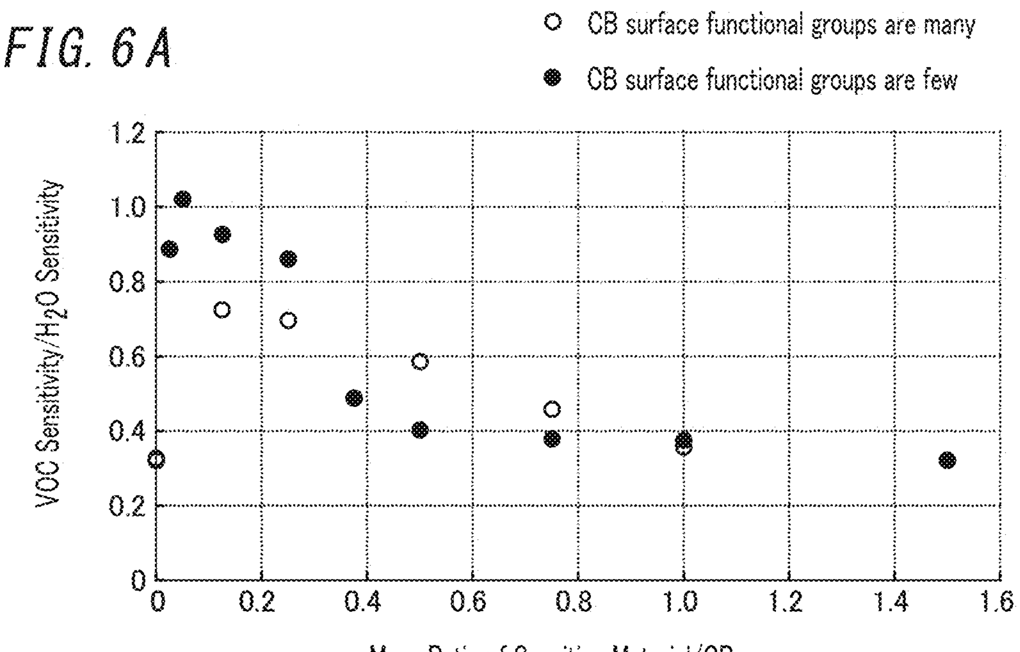
FIG. 6A is a graph showing a relationship between a ratio by mass of a sensitive material of the gas sensor to a carbon black and a ratio of the sensor sensitivity to an analyte (VOCs) to the sensor sensitivity to water.
Figure 6B:
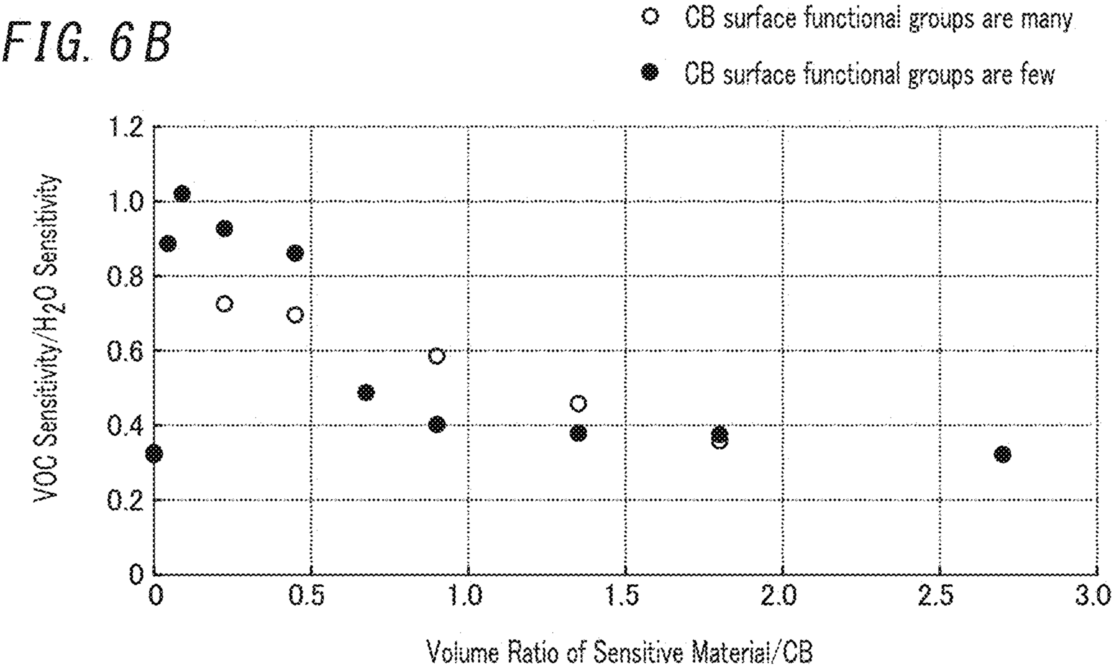
FIG. 6B is a graph showing a relationship between a ratio by volume of the sensitive material of the gas sensor to the carbon black and the ratio of the sensor sensitivity to the analyte (VOCs) to the sensor sensitivity to water.

FIGS. 6A and 6B are graphs, each showing the VOC sensitivity/$H_2O$ sensitivity in the same way as described above. The sensitive membrane 20 used for measuring the VOC sensitivity/$H_2O$ sensitivity uses a carbon black as the plurality of conductive particles 202. In this case, a sensitive membrane 20 that used a carbon black with a relatively small number of surface functional groups (labeled as "CB surface functional groups are few") and a sensitive membrane 20 that used a carbon black with a relatively large number of surface functional groups (labeled as "CB surface functional groups are many") were formed. The carbon black with a relatively small number of surface functional groups had a volatile content of 2.4 wt % and the carbon black with a relatively large number of surface functional groups had a volatile content of 8.0 wt %. As used herein, the volatile content refers to the volatile loss of the carbon black when the carbon black is heated at 950° C. for 7 minutes. Note that the volatile content may be measured by the method described in "Testing Methods of Carbon Black for Rubber Industry" according to the JIS K 6221 standard. Specifically, a specified amount of a carbon black is introduced into a crucible and heated at 950° C. for 7 minutes, and then the volatile loss of the carbon black is measured.

As is clear from FIG. 6A, in a range where the ratio by mass (M1/M2 ratio) of the sensitive material to the carbon black (CB) is equal to or less than 0.4, in particular, in a range where the ratio by mass (M1/M2 ratio) of the sensitive material to the carbon black (CB) is equal to or greater than 0.025 and equal to or less than 0.25, the VOC sensitivity/

$H_2O$ sensitivity is higher when the CB surface functional groups are few than when the CB surface functional groups are many. In addition, as is clear from FIG. 6B, in a range where the ratio by volume (V1/V2 ratio) of the sensitive material to the carbon black (CB) is equal to or less than 0.72, in particular, in a range where the ratio by volume (V1/V2 ratio) of the sensitive material to the carbon black (CB) is equal to or greater than 0.045 and equal to or less than 0.45, the VOC sensitivity/$H_2O$ sensitivity is higher when the CB surface functional groups are few than when the CB surface functional groups are many That is why using a carbon black with a relatively small number of surface functional groups is preferred to using a carbon black with a relatively large number of surface functional groups to reduce the effect of water on the sensitive membrane. In this embodiment, a carbon black with a smaller number of surface functional groups is preferably used in a range where the volatile content is equal to or greater than 2.5 wt % and equal to or less than 8 wt %. Note that in this embodiment, even a carbon black with a volatile content less than 2.5 wt % may also be used.

Alternatively, the number of CB surface functional groups may also be estimated by performing mass spectrometry on the gas generated at an elevated temperature. Specifically, 1 mg of a sample is heated at a temperature increase rate of 10° C./min from room temperature to 1000° C. in a helium atmosphere and the gas generated is loaded into, and analyzed by, a mass spectrometer. Based on a gas emission profile (where m/z falls within the range from 10 to 600) thus obtained, m/z profiles (where m/z=18, 28, 44) of $H_2O$, CO, $N_2$, and $CO_2$, which are gases derived from the surface functional groups, are extracted. Then, each of these gases has its peak area compared with that of a reference material (such as sodium tungstate dihydrate or calcium oxalate monohydrate). In this manner, the number of CB surface functional groups may be quantified. Performing such a mass spectrometry on the gas generated at an elevated temperature allows the volatile content of even a small amount of sample to be calculated, thus enabling obtaining results comparable to the volatile content measuring method according to the JIS K 6221 standard.

Figure 7A:
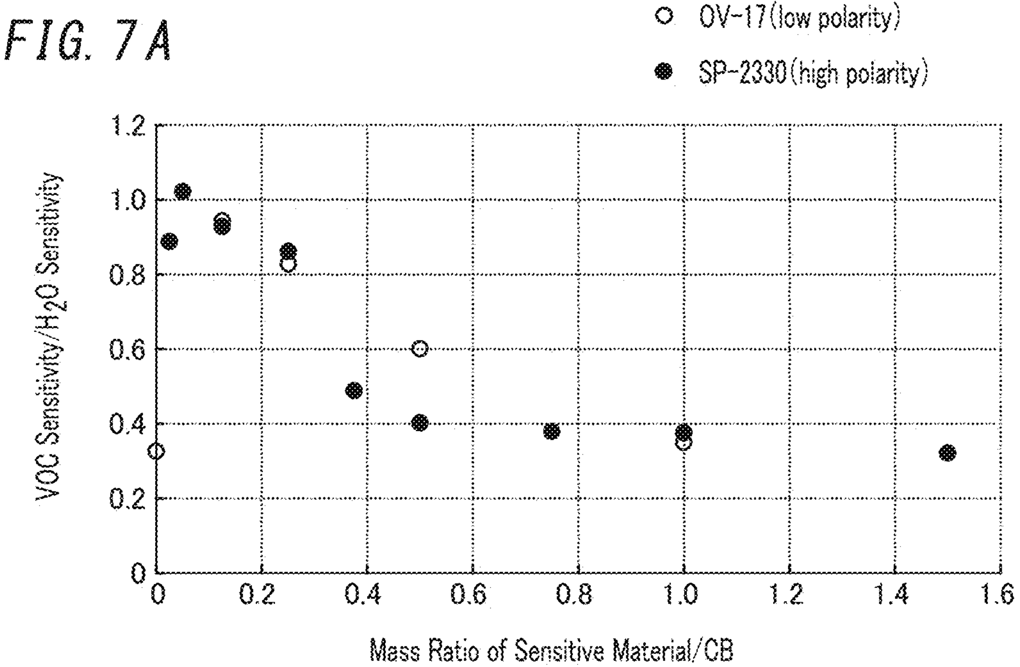
FIG. 7A is a graph showing a relationship between a ratio by mass of a sensitive material of the gas sensor to a carbon black and a ratio of the sensor sensitivity to an analyte (VOCs) to the sensor sensitivity to water.
Figure 7B:
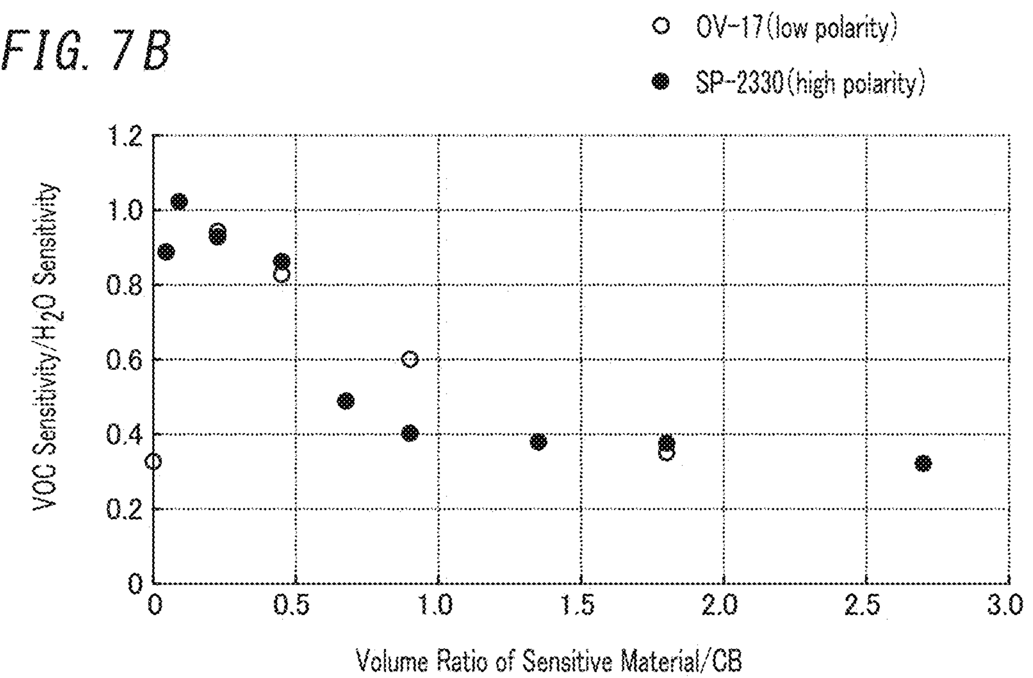
FIG. 7B is a graph showing a relationship between a ratio by volume of the sensitive material of the gas sensor to the carbon black and the ratio of the sensor sensitivity to the analyte (VOCs) to the sensor sensitivity to water.

FIGS. 7A and 7B are graphs, each showing the VOC sensitivity/$H_2O$ sensitivity in the same way as described above. One sensitive membrane 20 used for measuring the VOC sensitivity/$H_2O$ sensitivity used a sensitive material with high polarity. The other sensitive membrane 20 used for measuring the VOC sensitivity/$H_2O$ sensitivity used a sensitive material with low polarity. As the high-polarity sensitive material, bis cyanopropyl-cyanopropylphenyl polysiloxane (product name SP-2330 manufactured by Sigma-Aldrich) was also used as in the example described above. As the low-polarity sensitive material, methylphenylpolysiloxane (product name OV-17 manufactured by Shinwa Chemical Industries Ltd.) was used.

As is clear from FIG. 7A, no matter whether the sensitive material used has high polarity or low polarity, in a range where the ratio by mass (M1/M2 ratio) of the sensitive material to the carbon black (CB) is equal to or less than 0.4, in particular, in a range where the ratio by mass (M1/M2 ratio) of the sensitive material to the carbon black (CB) is equal to or greater than 0.025 and equal to or less than 0.25, the VOC sensitivity/$H_2O$ sensitivity has a high value. In addition, as is clear from FIG. 7B, no matter whether the sensitive material used has high polarity or low polarity, in a range where the ratio by volume (V1/V2 ratio) of the sensitive material to the carbon black (CB) is equal to or less than 0.72, in particular, in a range where the ratio by volume (V1/V2 ratio) of the sensitive material to the carbon black (CB) is equal to or greater than 0.045 and equal to or less than 0.45, the VOC sensitivity/$H_2O$ sensitivity has a high value. Consequently, the effect of water on the sensitive membrane would be reduced by decreasing the ratio of the sensitive material to the plurality of conductive particles, irrespective of the polarity of the sensitive material.

Figure 8A:
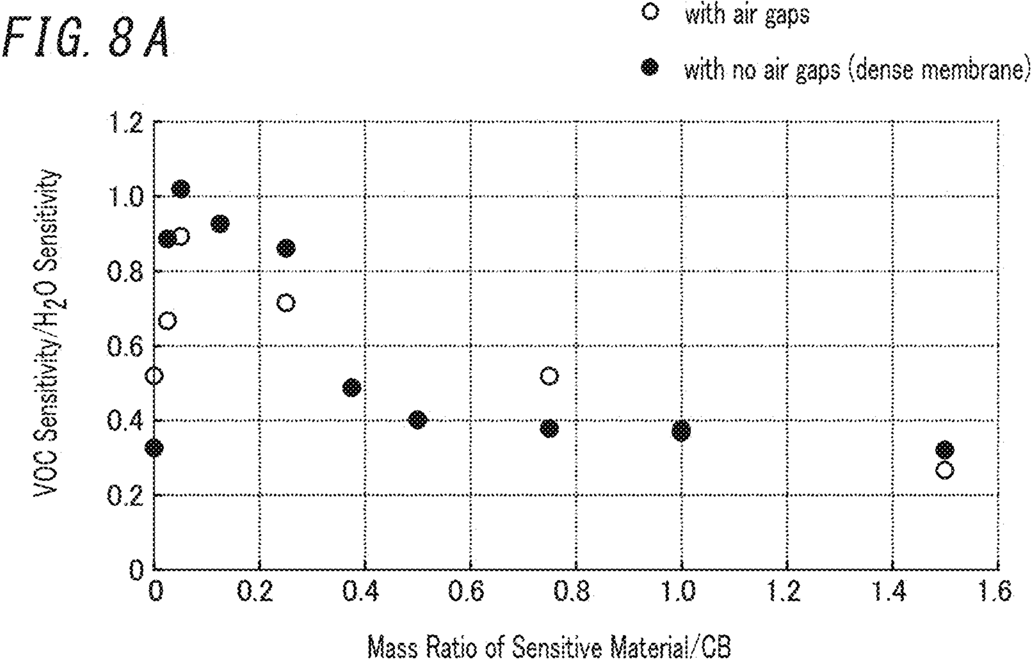
FIG. 8A is a graph showing a relationship between a ratio by mass of a sensitive material of the gas sensor to a carbon black and a ratio of the sensor sensitivity to an analyte (VOCs) to the sensor sensitivity to water.
Figure 8B:
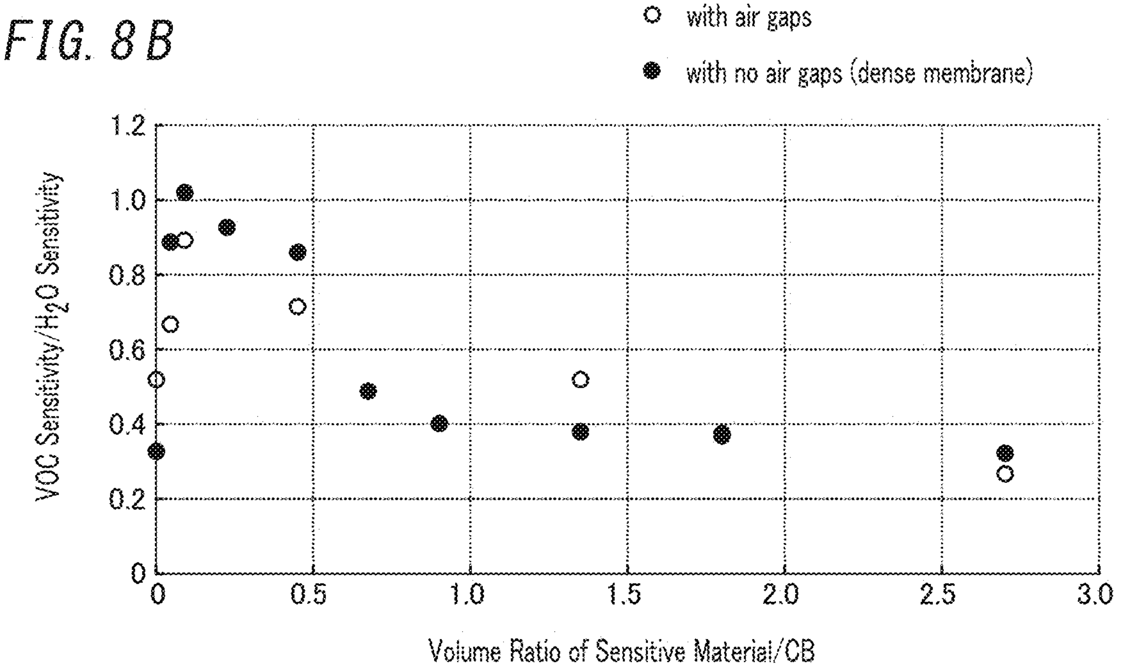
FIG. 8B is a graph showing a relationship between a ratio by volume of the sensitive material of the gas sensor to the carbon black and the ratio of the sensor sensitivity to the analyte (VOCs) to the sensor sensitivity to water.

FIGS. 8A and 8B are graphs, each showing the VOC sensitivity/$H_2O$ sensitivity in the same way as described above. The sensitive membranes 20 used for measuring the VOC sensitivity/$H_2O$ sensitivity used a sensitive material with high polarity. As the high-polarity sensitive material, bis cyanopropyl-cyanopropylphenyl polysiloxane (product name SP-2330 manufactured by Sigma-Aldrich) was also used as in the example described above. Meanwhile, one sensitive membrane 20 was formed to have air gaps in the membrane body 201 thereof, while another sensitive membrane 20 was formed to have no air gaps in the membrane body 201 thereof. The membrane body 201 with no air gaps was formed as a dense membrane. The membrane body 201 with air gaps was formed by subjecting a part of the sensitive material to pyrolysis.

As is clear from FIG. 8A, the sensitive membrane 20 with no air gaps exhibits a higher VOC sensitivity/$H_2O$ sensitivity than the sensitive membrane 20 with air gaps in a range where the ratio by mass (M1/M2 ratio) of the sensitive material to the carbon black (CB) is equal to or less than 0.4, in particular, in a range where the ratio by mass (M1/M2 ratio) of the sensitive material to the carbon black (CB) is equal to or greater than 0.025 and equal to or less than 0.25. In addition, as is clear from FIG. 8B, the sensitive membrane 20 with no air gaps exhibits a higher VOC sensitivity/$H_2O$ sensitivity than the sensitive membrane 20 with air gaps in a range where the ratio by volume (V1/V2 ratio) of the sensitive material to the carbon black (CB) is equal to or less than 0.72, in particular, in a range where the ratio by volume (V1/V2 ratio) of the sensitive material to the carbon black (CB) is equal to or greater than 0.045 and equal to or less than 0.45. That is why a dense membrane with no air gaps is preferred to the sensitive membrane 20 with air gaps to reduce the effect of water.

Figure 9A:
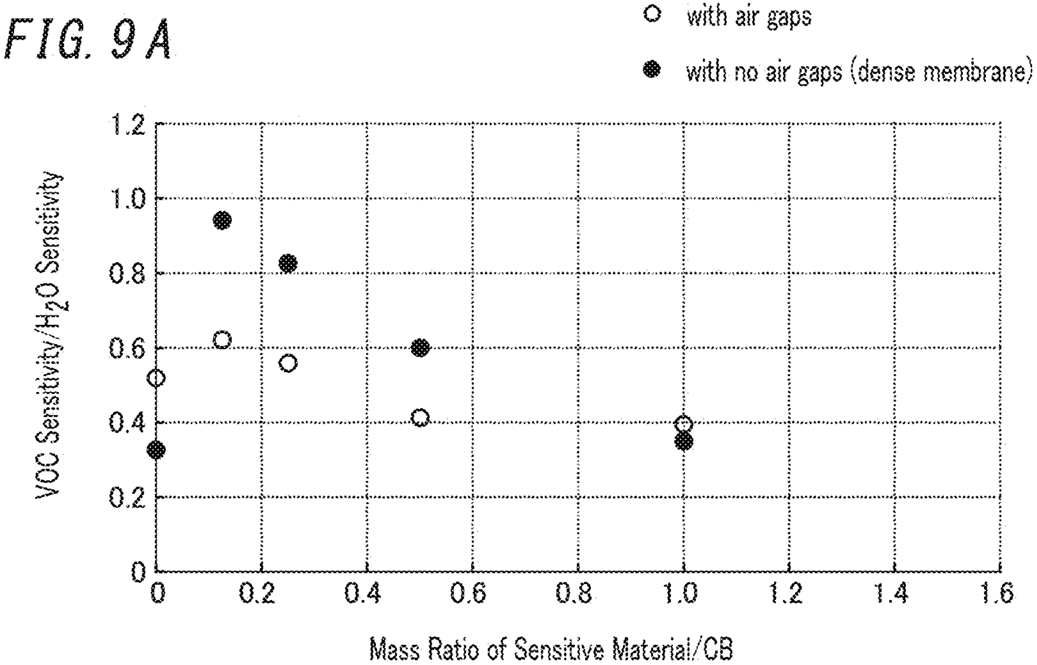
FIG. 9A is a graph showing a relationship between a ratio by mass of a sensitive material of the gas sensor to a carbon black and a ratio of the sensor sensitivity to an analyte (VOCs) to the sensor sensitivity to water.
Figure 9B:
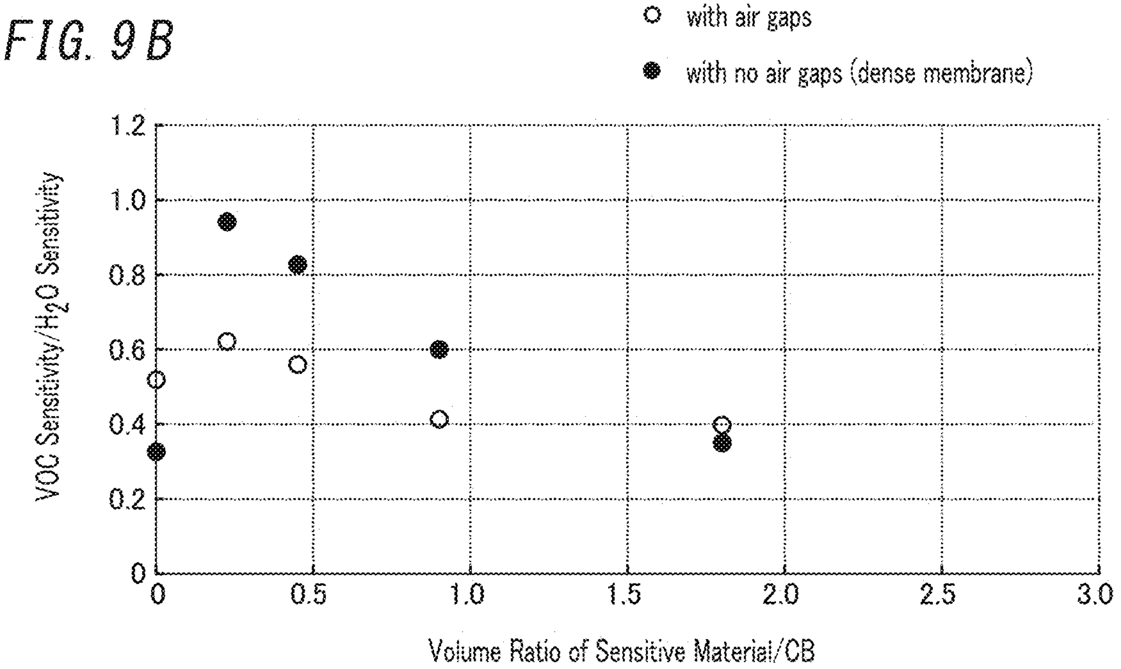
FIG. 9B is a graph showing a relationship between a ratio by volume of the sensitive material of the gas sensor to the carbon black and the ratio of the sensor sensitivity to the analyte (VOCs) to the sensor sensitivity to water.

FIGS. 9A and 9B are graphs, each showing the VOC sensitivity/$H_2O$ sensitivity in the same way as described above. The sensitive membranes 20 used for measuring the VOC sensitivity/$H_2O$ sensitivity used a sensitive material with low polarity. As the low-polarity sensitive material, methylphenylpolysiloxane (product name OV-17 manufactured by Shinwa Chemical Industries Ltd.) was also used as in the example described above. Meanwhile, one sensitive membrane 20 was formed to have air gaps in the membrane body 201 thereof, while another sensitive membrane 20 was formed to have no air gaps in the membrane body 201 thereof.

As is clear from FIG. 9A, even when the low-polarity sensitive material is used as in the situation where the high-polarity sensitive material is used, the sensitive membrane 20 with no air gaps exhibits a higher VOC sensitivity/$H_2O$ sensitivity than the sensitive membrane 20 with air gaps in a range where the ratio by mass (M1/M2 ratio) of the sensitive material to the carbon black (CB) is equal to or less than 0.4, in particular, in a range where the ratio by mass (M1/M2 ratio) of the sensitive material to the carbon black (CB) is equal to or greater than 0.025 and equal to or less than 0.25. In addition, as is clear from FIG. 9B, even when the low-polarity sensitive material is used as in the situation where the high-polarity sensitive material is used, the sensitive membrane 20 with no air gaps exhibits a higher VOC sensitivity/$H_2O$ sensitivity than the sensitive membrane 20 with air gaps in a range where the ratio by volume (V1/V2 ratio) of the sensitive material to the carbon black (CB) is equal to or less than 0.72, in particular, in a range where the ratio by volume (V1/V2 ratio) of the sensitive material to the carbon black (CB) is equal to or greater than 0.045 and equal to or less than 0.45. That is why even when the low-polarity sensitive material is used, a dense membrane with no air gaps is preferred to the sensitive membrane 20 with air gaps to reduce the effect of water.

(Recapitulation)

As can be seen from the foregoing description, a sensitive membrane (20) according to a first aspect includes: a membrane body (201) containing a sensitive material; and a plurality of conductive particles (202) included in the membrane body (201). The membrane body (201) is expandable when adsorbing an analyte. An M1/M2 ratio of a mass M1 of the sensitive material to a mass M2 of the plurality of conductive particles (202) is equal to or less than 0.4.

This aspect may reduce the response of the sensitive membrane (20) to water, thus achieving the advantage of relatively increasing the responsivity of the sensitive membrane (20) to the analyte.

In a sensitive membrane (20) according to a second aspect, which may be implemented in conjunction with the first aspect, the M1/M2 ratio of the mass M1 of the sensitive material to the mass M2 of the plurality of conductive particles (202) is equal to or greater than 0.025 and equal to or less than 0.25.

This aspect may further reduce the response of the sensitive membrane (20) to water, thus achieving the advantage of further relatively increasing the responsivity of the sensitive membrane (20) to the analyte.

A sensitive membrane (20) according to a third aspect includes: a membrane body (201) containing a sensitive material; and a plurality of conductive particles (202) included in the membrane body (201). The membrane body (201) is expandable when adsorbing an analyte. A V1/V2 ratio of a volume V1 of the sensitive material to a volume V2 of the plurality of conductive particles is equal to or less than 0.72.

This aspect may reduce the response of the sensitive membrane (20) to water, thus achieving the advantage of relatively increasing the responsivity of the sensitive membrane (20) to the analyte.

In a sensitive membrane (20) according to a fourth aspect, which may be implemented in conjunction with the third aspect, the V1/V2 ratio of the volume V1 of the sensitive material to the volume V2 of the plurality of conductive particles (202) is equal to or greater than 0.045 and equal to or less than 0.45.

This aspect may further reduce the response of the sensitive membrane (20) to water, thus achieving the advantage of further relatively increasing the responsivity of the sensitive membrane (20) to the analyte.

In a sensitive membrane (20) according to a fifth aspect, which may be implemented in conjunction with any one of the first to fourth aspects, the plurality of conductive particles (202) contains a carbon black. The carbon black has a dibutyl phthalate absorption number less than 100 $cm^3$/100 g.

This aspect achieves the advantage of increasing the sensitivity of the gas sensor because the carbon black has such an undeveloped structure that the sensitive membrane (20) causes electrical conduction by tunneling effect.

In a sensitive membrane (20) according to a sixth aspect, which may be implemented in conjunction with any one of the first to fourth aspects, the plurality of conductive particles (202) contains a carbon black. The carbon black has a Dst/D0 ratio less than 4, where Dst is a Stokes mode diameter of an aggregate as measured by centrifugal sedimentation analysis and D0 is a mean primary particle size.

This aspect achieves the advantage of increasing the sensitivity of the gas sensor because the carbon black has such an undeveloped structure that the sensitive membrane (20) causes electrical conduction by tunneling effect.

A gas sensor (1) according to a seventh aspect includes: the sensitive membrane (20) according to any one of the first to sixth aspects; and an electrode (21) electrically connected to the sensitive membrane (20).

This aspect achieves the advantage of increasing the sensitivity of the gas sensor (1) by having the sensitive membrane (20) reduce response to water other than the water contained in the analyte.

REFERENCE SIGNS LIST

1 Gas Sensor
20 Sensitive Membrane
201 Membrane Body
21 Electrode

The invention claimed is:

1. A sensitive membrane comprising:
a membrane body containing a sensitive material; and
a plurality of conductive particles included in the membrane body, wherein:
the membrane body is expandable when adsorbing an analyte,
an M1/M2 ratio of a mass M1 of the sensitive material to a mass M2 of the plurality of conductive particles is equal to or less than 0.4,
the sensitive material is selected from the group consisting of glycerol, dicarboxylic acid monoester, and aliphatic amine,
the sensitive material coats an entire outer surface of the plurality of conductive particles,
the plurality of conductive particles have a mean particle size of 15 nm, and
a thickness of the sensitive material coated on the entire outer surface of the plurality of conductive particles is about 2.2 nm.

2. The sensitive membrane of claim 1, wherein
the M1/M2 ratio of the mass M1 of the sensitive material to the mass M2 of the plurality of conductive particles is equal to or greater than 0.025 and equal to or less than 0.25.

3. The sensitive membrane of claim 2, wherein
the plurality of conductive particles contains a carbon black, and
the carbon black has a dibutyl phthalate absorption number less than 100 $cm^3$/100 g.

4. The sensitive membrane of claim 2, wherein
the plurality of conductive particles contains a carbon black, and
the carbon black has a Dst/D0 ratio less than 4, where Dst is a Stokes mode diameter of an aggregate as measured by centrifugal sedimentation analysis and D0 is a mean primary particle size.

5. A gas sensor comprising:
the sensitive membrane of claim 2; and
an electrode electrically connected to the sensitive membrane.

6. The sensitive membrane of claim 1, wherein the plurality of conductive particles contains a carbon black, and the carbon black has a dibutyl phthalate absorption number less than 100 $cm^3$/100 g.

7. The sensitive membrane of claim 1, wherein the plurality of conductive particles contains a carbon black, and the carbon black has a Dst/D0 ratio less than 4, where Dst is a Stokes mode diameter of an aggregate as measured by centrifugal sedimentation analysis and D0 is a mean primary particle size.

8. A gas sensor comprising:

the sensitive membrane of claim 1; and an electrode electrically connected to the sensitive membrane.

9. The sensitive membrane of claim 1, wherein the plurality of conductive particles contains a carbon black, and the carbon black comprises a volatile content in an amount of equal to or greater than 2.5 wt % and equal to or less than 8 wt %.

10. A sensitive membrane comprising:

a membrane body containing a sensitive material; and a plurality of conductive particles included in the membrane body, wherein:

the membrane body is expandable when adsorbing an analyte, a V1/V2 ratio of a volume V1 of the sensitive material to a volume V2 of the plurality of conductive particles is equal to or less than 0.72, the sensitive material is selected from the group consisting of glycerol, dicarboxylic acid monoester, and aliphatic amine, the sensitive material coats an entire outer surface of the plurality of conductive particles, the plurality of conductive particles have a mean particle size of 15 nm, and a thickness of the sensitive material coated on the entire outer surface of the plurality of conductive particles is about 2.2 nm.

11. The sensitive membrane of claim 10, wherein the V1/V2 ratio of the volume V1 of the sensitive material to the volume V2 of the plurality of conductive particles is equal to or greater than 0.045 and equal to or less than 0.45.

12. The sensitive membrane of claim 11, wherein the plurality of conductive particles contains a carbon black, and the carbon black has a dibutyl phthalate absorption number less than 100 $cm^3$/100 g.

13. The sensitive membrane of claim 11, wherein the plurality of conductive particles contains a carbon black, and the carbon black has a Dst/D0 ratio less than 4, where Dst is a Stokes mode diameter of an aggregate as measured by centrifugal sedimentation analysis and D0 is a mean primary particle size.

14. A gas sensor comprising:

the sensitive membrane of claim 11; and an electrode electrically connected to the sensitive membrane.

15. The sensitive membrane of claim 10, wherein the plurality of conductive particles contains a carbon black, and the carbon black has a dibutyl phthalate absorption number less than 100 $cm^3$/100 g.

16. The sensitive membrane of claim 10, wherein the plurality of conductive particles contains a carbon black, and the carbon black has a Dst/D0 ratio less than 4, where Dst is a Stokes mode diameter of an aggregate as measured by centrifugal sedimentation analysis and D0 is a mean primary particle size.

17. A gas sensor comprising:

the sensitive membrane of claim 10; and an electrode electrically connected to the sensitive membrane.

18. The sensitive membrane of claim 10, wherein the plurality of conductive particles contains a carbon black, and the carbon black comprises a volatile content in an amount of equal to or greater than 2.5 wt % and equal to or less than 8 wt %.

19. A sensitive membrane comprising:

a membrane body containing a sensitive material; and a plurality of conductive particles included in the membrane body, wherein:

the membrane body is expandable when adsorbing an analyte, an M1/M2 ratio of a mass M1 of the sensitive material to a mass M2 of the plurality of conductive particles is equal to or greater than 0.025 and equal to or less than 0.25, the sensitive material includes silicone, the sensitive material coats an entire outer surface of the plurality of conductive particles, the plurality of conductive particles have a mean particle size of 15 nm, and a thickness of the sensitive material coated on the entire outer surface of the plurality of conductive particles is about 2.2 nm.

20. The sensitive membrane of claim 19, wherein the sensitive material includes bis cyanopropyl-cyanopropylphenyl polysiloxane.

* * * * *